(12) United States Patent
Pearl, Jr. et al.

(10) Patent No.: US 12,077,711 B2
(45) Date of Patent: Sep. 3, 2024

(54) FLUID LOSS ADDITIVE FOR LOW-PORTLAND OR NON-PORTLAND CEMENTS

(71) Applicant: Halliburton Energy Services, Inc., Houston, TX (US)

(72) Inventors: William Cecil Pearl, Jr., Houston, TX (US); Samuel Lewis, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/149,915

(22) Filed: Jan. 4, 2023

(65) Prior Publication Data

US 2023/0143012 A1 May 11, 2023

Related U.S. Application Data

(62) Division of application No. 17/022,975, filed on Sep. 16, 2020, now Pat. No. 11,584,877.

(51) Int. Cl.
*C09K 8/487* (2006.01)
*C04B 24/26* (2006.01)
(Continued)

(52) U.S. Cl.
CPC .......... *C09K 8/487* (2013.01); *C04B 24/2623* (2013.01); *C04B 28/04* (2013.01);
(Continued)

(58) Field of Classification Search
CPC ..... C09K 8/487; C04B 24/2623; C04B 28/04; C04B 28/12; C04B 2103/0062; C04B 2103/46; E21B 33/13
See application file for complete search history.

(56) References Cited

U.S. PATENT DOCUMENTS

| | | |
|---|---|---|
| 2004/0127606 A1 | 7/2004 | Goodwin |
| 2013/0087332 A1 | 4/2013 | Miller et al. |

(Continued)

FOREIGN PATENT DOCUMENTS

| | | | |
|---|---|---|---|
| EP | 0705850 A1 | 10/1996 | |
| WO | 2015041679 A1 | 3/2015 | |

(Continued)

OTHER PUBLICATIONS

English Translation of WO 2019163490 A1.
(Continued)

*Primary Examiner* — Crystal J Lee
(74) *Attorney, Agent, or Firm* — Sheri Higgins; Sheri Higgins Law, PLLC

(57) ABSTRACT

A cement composition can include water; cement, wherein less than 75 w/w % of the total amount of the cement is Portland cement; and a fluid loss additive, wherein the fluid loss additive comprises a polymer network having at least one branching point formed with a monomer and a cross-linking agent that comprises at least three active functional groups. The cement can also be a non-Portland cement. The monomer can be a vinyl ester-based monomer that is polymerized with the cross-linking agent to form the polymer network. The cement composition can be used in an oil and gas operation.

19 Claims, 2 Drawing Sheets

(51) Int. Cl.
  *C04B 28/04*    (2006.01)
  *C04B 28/12*    (2006.01)
  *C04B 103/00*   (2006.01)
  *C04B 103/46*   (2006.01)
  *E21B 33/13*    (2006.01)

(52) U.S. Cl.
  CPC .............. *C04B 28/12* (2013.01); *E21B 33/13* (2013.01); *C04B 2103/0062* (2013.01); *C04B 2103/46* (2013.01)

(56) References Cited

U.S. PATENT DOCUMENTS

| | | |
|---|---|---|
| 2016/0264840 A1* | 9/2016 | Nelson .................. C09K 8/467 |
| 2018/0346804 A1 | 12/2018 | Blazewicz et al. |
| 2020/0224076 A1 | 7/2020 | Yamashita et al. |

FOREIGN PATENT DOCUMENTS

| | | |
|---|---|---|
| WO | 2015105675 A1 | 7/2015 |
| WO | 2019163490 A1 | 8/2019 |

OTHER PUBLICATIONS

R. Baudry and D.C. Sherrington, Facile Synthesis of Branched Poly(vinyl alcohol)s, Macromolecules, Department of Pure and Applied Chemistry, Westchem Graduate School of Chemistry, University of Strathclyde, Jun. 2006, pp. 5230-5237, vol. 39, No. 16, Scotland, U.K.

* cited by examiner

FLUID LOSS ADDITIVE FOR LOW-PORTLAND OR NON-PORTLAND CEMENTS

TECHNICAL FIELD

Fluid loss additives can be used in cement compositions to reduce the amount of water lost from the cement. Cement compositions can include a variety of different cements. Some cement compositions can include little to no Portland cement. Novel fluid loss additives are disclosed for use in low-Portland or non-Portland cements.

BRIEF DESCRIPTION OF THE FIGURES

The features and advantages of certain embodiments will be more readily appreciated when considered in conjunction with the accompanying figures. The figures are not to be construed as limiting any of the preferred embodiments.

DETAILED DESCRIPTION

Figure 1:
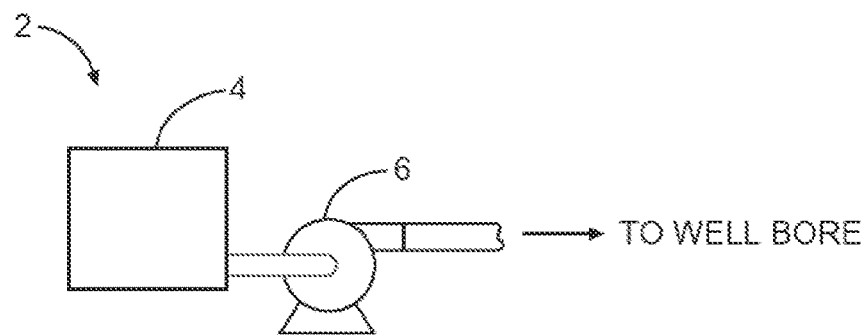
FIG. 1 illustrates a system for preparation and delivery of a cement composition to a wellbore according to certain embodiments.

Oil and gas hydrocarbons are naturally occurring in some subterranean formations. In the oil and gas industry, a subterranean formation containing oil and/or gas is referred to as a reservoir. A reservoir can be located under land or off shore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir. The oil, gas, or water produced from a reservoir is called a reservoir fluid.

As used herein, a "fluid" is a substance having a continuous phase that can flow and conform to the outline of its container when the substance is tested at a temperature of 71° F. (22° C.) and a pressure of one atmosphere "atm" (0.1 megapascals "MPa"). A fluid can be a liquid or gas. A homogenous fluid has only one phase; whereas a heterogeneous fluid has more than one distinct phase. A colloid is an example of a heterogeneous fluid. A heterogeneous fluid can be: a slurry, which includes a continuous liquid phase and undissolved solid particles as the dispersed phase; an emulsion, which includes a continuous liquid phase and at least one dispersed phase of immiscible liquid droplets; a foam, which includes a continuous liquid phase and a gas as the dispersed phase; or a mist, which includes a continuous gas phase and liquid droplets as the dispersed phase. As used herein, the term "base fluid" means the solvent of a solution or the continuous phase of a heterogeneous fluid and is the liquid that is in the greatest percentage by volume of a treatment fluid.

A well can include, without limitation, an oil, gas, or water production well, an injection well, or a geothermal well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered to be the region within approximately 100 feet radially of the wellbore. As used herein, "into a subterranean formation" means and includes into any portion of the well, including into the wellbore, into the near-wellbore region via the wellbore, or into the subterranean formation via the wellbore.

A portion of a wellbore can be an open hole or cased hole. In an open-hole wellbore portion, a tubing string can be placed into the wellbore. The tubing string allows fluids to be introduced into or flowed from a remote portion of the wellbore. In a cased-hole wellbore portion, a casing is placed into the wellbore that can also contain a tubing string. A wellbore can contain an annulus. Examples of an annulus include but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

During well completion, it is common to introduce a cement composition into an annulus in a wellbore. For example, in a cased-hole wellbore, a cement composition can be placed into and allowed to set in the annulus between the wellbore and the casing in order to stabilize and secure the casing in the wellbore. By cementing the casing in the wellbore, fluids are prevented from flowing into the annulus. Consequently, oil or gas can be produced in a controlled manner by directing the flow of oil or gas through the casing and into the wellhead. Cement compositions can also be used in primary or secondary cementing operations, well-plugging, or squeeze cementing. As used herein, a "cement composition" is a mixture of at least cement and water, and possibly other additives.

As used herein, a "cement composition" is a mixture of at least cement and water. A cement composition can include additives. As used herein, the term "cement" means an initially dry substance that develops compressive strength or sets in the presence of water. Extended life cements can be designed to set after an extended period of time, for example days or weeks. As used herein, "cement" also includes extended life cements regardless of how long it takes for the cement composition to set. Some examples of cements include, but are not limited to, Portland cements, gypsum cements, high alumina content cements, slag cements, high magnesia content cements, sorel cements, and combinations thereof. A cement composition is a heterogeneous fluid including water as the continuous phase of the slurry and the cement (and any other insoluble particles) as the dispersed phase. The continuous phase of a cement composition can include dissolved substances.

In recent years, development and use of low- or non-Portland cement compositions have increased. Portland cements can be classified as Classes A, C, H, and G cements according to American Petroleum Institute, API Specification for Materials and Testing for Well Cements, API Specification 10, Fifth Ed., Jul. 1, 1990. Portland cements can also be classified as type I, type II, type III, type IV, or type V cements according to the American National Standards Institute. These newer cement compositions may replace some or all of the Portland cement with other cements, such as, pozzolan, lime, fly ash, kiln dust, or other cements. As used herein, a "pozzolan" is a siliceous or siliceous and aluminous material which, in itself, possesses little or no cementitious value but which will, in finely divided form and in the presence of water, chemically react with a source of calcium, lime, sodium, or potassium for example, at a temperature of 71° F. (22° C.) to form compounds possessing cementitious properties. As used herein, the phrase "cementitious properties" means the ability to bind materials together, develop compressive strength, and set. It is to be understood that the term "pozzolan" does not necessarily indicate the exact chemical make-up of the material, but rather refers to its capability of reacting with a source of calcium and water to form compounds possessing cementitious properties. When a pozzolan is mixed with water and a lime source, the silicate phases of the pozzolan can undergo a hydration reaction and form hydration products of calcium silicate hydrate (often abbreviated as C—S—H) and also possibly calcium aluminate hydrate.

The use of low- to non-Portland cements can have several advantages. Some of these advantages include lower cost, improved mechanical properties such as compressive strength, the ability to reduce the density of the cement composition while still maintaining the improved mechanical properties, increased temperature stability, and more environmentally friendly.

During wellbore operations, fluids, such as water, included in a cement composition can be lost from the cement composition. This is commonly referred to as fluid loss. The loss of significant amounts of fluid from the cement composition can adversely affect, inter alia, the viscosity, thickening time, setting time, and compressive strength of the cement composition. Therefore, it is common to include a fluid loss additive in a cement composition in order to help minimize the amount of fluid that is lost from the cement composition.

Polymers have been used as a fluid loss additive. A polymer is a molecule composed of repeating units, typically connected by covalent chemical bonds. A polymer is formed from monomers. During the formation of the polymer, some chemical groups can be lost from each monomer. The piece of the monomer that is incorporated into the polymer is known as the repeating unit or monomer residue. The backbone of the polymer is the continuous link between the monomer residues. The polymer can also contain pendant functional groups connected to the backbone at various locations along the backbone. Polymer nomenclature is generally based upon the type of monomer residues comprising the polymer. A polymer formed from one type of monomer residue is called a homopolymer. A polymer formed from two or more different types of monomer residues is called a copolymer. The number of repeating units of a polymer is referred to as the chain length of the polymer. The number of repeating units of a polymer can range from approximately 11 to greater than 10,000. In a copolymer, the repeating units from each of the monomer residues can be arranged in various manners along the polymer chain. For example, the repeating units can be random, alternating, periodic, or block. The conditions of the polymerization reaction can be adjusted to help control the average number of repeating units (the average chain length) of the polymer. Polymer molecules can be cross-linked. As used herein, a "cross-link" and all grammatical variations thereof is a bond between two or more polymer molecules—typically between pendent functional groups of the polymer and reactive functional groups of a cross-linking agent. Cross-linked polymer molecules can form a polymer network.

Fluid loss additives, such as 2-acrylamido-2-methylpropane sulfonic acid (AMPS), N,N-dimethylacrylamide ("NNDMA"), 2-acrylamido-2-methylpropanesulfonate salts having counter ions such as sodium, calcium, magnesium, and ammonium ions, and sodium 2-acrylamido-2-methyl-propanesulfonate, that have been developed for use in Portland cement compositions may not perform as well and/or require a much higher concentration in low- or non-Portland cements. Accordingly, there is a need and on-going industry wide concern for new fluid loss additives that exhibit good performance in low- or non-Portland cement compositions.

It has unexpectedly been discovered that a branched polymer network can be used as a fluid loss additive in low- or non-Portland cement compositions. The new fluid loss additive can provide decreased fluid loss and impart desirable properties to the cement composition.

Some of the desirable properties of a cement composition include low fluid loss, viscosity, thickening time, and compressive strength. As used herein, the "fluid loss" of a cement composition is tested according to the API 10B-2 static fluid loss procedure at a specified temperature and pressure differential as follows. The cement composition is mixed. The cement composition is placed into an atmospheric consistometer, such as a FANN® Model 165 AT consistometer, heated to the specified temperature, and then maintained at the specified temperature for 30 minutes. A test cell of a fluid loss test assembly, such as a FANN® fluid loss test assembly, is pre-heated to the specified temperature. The cement composition is then placed into the test cell of the fluid loss test assembly. The cement composition is then tested for fluid loss at the specified pressure differential. Fluid loss is measured in milliliters (mL) of fluid collected in 30 min or if a blowout occurs before 30 mins the elapsed time and volume collected is used to calculate the total fluid loss volume. The total mL of fluid loss collected in 30 mins is then multiplied by 2 to obtain the API fluid loss for the cement composition in mL/30 min.

Viscosity is a measure of the resistance of a fluid to flow, defined as the ratio of shear stress to shear rate. Viscosity can be expressed in units of (force*time)/area. For example, viscosity can be expressed in units of dyne*s/cm$^2$ (commonly referred to as Poise (P)), or expressed in units of Pascals/second (Pa/s). However, because a material that has a viscosity of 1 P is a relatively viscous material, viscosity is more commonly expressed in units of centipoise (cP), which is 1/100 P. The viscosity of a material and pourability are inversely related. The higher the viscosity, the less easily the material can be poured. Conversely, the lower the viscosity, the more easily the material can be poured. It is desirable for a cement composition to be pourable.

As used herein, the "viscosity" of a material is measured according to API RP 10B-2/ISO 10426-2 as follows. The material to be tested, such as an aqueous solution or a suspension, is prepared. The material is placed into the test cell of a rotational viscometer, such as a FANN® Model 35 viscometer, fitted with a FANN® Yield Stress Adapter (FYSA) The material is tested at ambient temperature and pressure, about 71° F. (22° C.) and about 1 atm (0.1 MPa). Viscosity can be calculated using the following equation, expressed in units of centipoise:

$$V = \frac{k_1}{k_2}(1000)\frac{\theta}{N}$$

where $k_1$ is a constant that depends on the FYSA in units of 1/s; $k_2$ is a constant that depends on the FYSA in units of Pa; (1000) is the conversion constant from Pa*s to centipoise; θ is the dial reading on the viscometer; and N is the rpm.

During cementing operations, it is desirable for the cement composition to remain pumpable during introduction into a subterranean formation and until the cement composition is situated in the portion of the subterranean formation to be cemented. After the cement composition has reached the portion of the subterranean formation to be cemented, the cement composition can ultimately set. A cement composition that thickens too quickly while being pumped can damage pumping equipment or block tubing or pipes, and a cement composition that sets too slowly can cost time and money while waiting for the composition to set.

If any test (e.g., fluid loss, thickening time, or compressive strength) requires the step of mixing, then the cement composition is "mixed" according to the following procedure. The water is added to a mixing container and the container is then placed on a mixer base. The motor of the base is then turned on and maintained at 4,000 revolutions per minute (rpm). The cement and any other ingredients are added to the container at a uniform rate in not more than 15 seconds (s). After all the cement and any other ingredients have been added to the water in the container, a cover is then placed on the container, and the cement composition is mixed at 12,000 rpm (+/−500 rpm) for 35 s (+/−1 s). It is to be understood that the cement composition is mixed at ambient temperature and pressure (about 71° F. (22° C.) and about 1 atm (0.1 MPa)).

It is also to be understood that if any test (e.g., fluid loss, thickening time, or compressive strength) specifies the test be performed at a specified temperature and possibly a specified pressure, then the temperature and pressure of the cement composition is ramped up to the specified temperature and pressure after being mixed at ambient temperature and pressure. For example, the cement composition can be mixed at 71° F. (22° C.) and 1 atm (0.1 MPa) and then placed into the testing apparatus and the temperature of the cement composition can be ramped up to the specified temperature. As used herein, the rate of ramping up the temperature is in the range of about 3° F./min to about 5° F./min (about 1.5° C./min to about 3° C./min). After the cement composition is ramped up to the specified temperature and possibly pressure, the cement composition is maintained at that temperature and pressure for the duration of the testing.

As used herein, the "thickening time" is how long it takes for a cement composition to become unpumpable at a specified temperature and pressure. The pumpability of a cement composition is related to the consistency of the composition. The consistency of a cement composition is measured in Bearden units of consistency (Bc), a dimensionless unit with no direct conversion factor to the more common units of viscosity. As used herein, a cement composition becomes "unpumpable" when the consistency of the composition reaches 70 Bc. As used herein, the consistency of a cement composition is measured as follows. The cement composition is mixed. The cement composition is then placed in the test cell of a High-Temperature, High-Pressure (HTHP) consistometer, such as a FANN® Model 290 or a Chandler Model 8240. Consistency measurements are taken continuously until the cement composition exceeds 70 Bc.

A cement composition can develop compressive strength. Cement composition compressive strengths can vary from 0 psi to over 10,000 psi (0 to over 69 MPa). Compressive strength is generally measured at a specified time after the composition has been mixed and at a specified temperature and pressure. Compressive strength can be measured, for example, at a time of 24 hours. According to ANSI/API Recommended Practice 10B-2, compressive strength can be measured by either a destructive method or non-destructive method.

The destructive method mechanically tests the compressive strength of a cement composition sample taken at a specified time after mixing and by breaking the samples in a compression-testing device, such as a Super L Universal testing machine model 602, available from Tinius Olsen, Horsham in Pennsylvania, USA. According to the destructive method, compressive strength is calculated as the force required to break the sample divided by the smallest cross-sectional area in contact with the load-bearing plates of the compression-testing device. The compressive strength is reported in units of pressure, such as pound-force per square inch (psi) or megapascals (MPa).

The non-destructive method continually measures correlated compressive strength of a cement composition sample throughout the test period by utilizing a non-destructive sonic device such as an Ultrasonic Cement Analyzer (UCA) available from FANN® Instruments in Houston, Texas, USA. As used herein, the "compressive strength" of a cement composition is measured using the non-destructive method at a specified time, temperature, and pressure as follows. The cement composition is mixed. The cement composition is then placed in an Ultrasonic Cement Analyzer and tested at a specified temperature and pressure. The UCA continually measures the transit time of the acoustic signal through the sample. The UCA device contains preset algorithms that correlate transit time to compressive strength. The UCA reports the compressive strength of the cement composition in units of pressure, such as psi or MPa.

The compressive strength of a cement composition can be used to indicate whether the cement composition has initially set or set. As used herein, a cement composition is considered "initially set" when the cement composition develops a compressive strength of 50 psi (0.3 MPa) using the non-destructive compressive strength method at a temperature of 212° F. (100° C.) and a pressure of 3,000 psi (20 MPa). As used herein, the "initial setting time" is the difference in time between when the cement and any other ingredients are added to the water and when the composition is initially set.

As used herein, the term "set," and all grammatical variations thereof, are intended to mean the process of becoming hard or solid by curing. As used herein, the "setting time" is the difference in time between when the cement and any other ingredients are added to the water and when the composition has set at a specified temperature. It can take up to 48 hours or longer for a cement composition to set. Some cement compositions can continue to develop compressive strength over the course of several days. The compressive strength of a cement composition can reach over 10,000 psi (69 MPa).

A cement composition can include: water; cement, wherein less than 75 w/w % of the cement is Portland cement; and a fluid loss additive, wherein the fluid loss additive comprises a polymer network having at least one branching point formed with a monomer and a cross-linking agent comprising at least three active functional groups.

Methods of cementing in a subterranean formation can include introducing the cement composition into the subterranean formation and allowing the cement composition to set.

It is to be understood that the discussion of any of the embodiments regarding the cement composition or any ingredient in the cement composition is intended to apply to all of the method and composition embodiments without the need to repeat the various embodiments throughout. Any reference to the unit "gallons" means U.S. gallons.

The cement composition includes water as the base fluid. The water can be selected from the group consisting of freshwater, brackish water, and saltwater, in any combination thereof in any proportion. The cement composition can further include a hydrocarbon liquid. The cement composition can also include a water-soluble salt. The salt according to any of the embodiments can be selected from sodium chloride, calcium chloride, calcium bromide, potassium chloride, potassium bromide, magnesium chloride, and any combination thereof in any proportion. The salt can be in a concentration in the range of about 0.1% to about 40% by weight of the water.

The cement composition includes cement, wherein less than 75 w/w % of the cement is Portland cement. The cement can be a hydraulic cement. A variety of hydraulic cements can be utilized including, but not limited to, those comprising calcium, aluminum, silicon, oxygen, iron, and/or sulfur, which set and harden by a reaction with water. Suitable hydraulic cements include, but are not limited to, Portland cements, gypsum cements, high alumina content cements, slag cements, high magnesia content cements, pozzolan, fly ash, lime, slaked lime, sorels cements, and combinations thereof. The cement according to any of the embodiments can include a combination of different cements. By way of example, the cement can be a combination of pozzolan and Portland cement, or the cement can be a combination of lime and fly ash. As stated above, less than 75 w/w % of the total amount of cement is Portland cement. According to other embodiments, less than 30 w/w % of the total amount of cement is Portland cement. The cement composition can also be a non-Portland cement (i.e., 0 w/w % of the total amount of cement is Portland cement).

The cement composition includes a fluid loss additive. The fluid loss additive comprises a polymer network having at least one branching point formed with a monomer and a cross-linking agent comprising at least three active functional groups. The cross-linking agent can be a poly-functional compound that is polymerized with the monomer to form the polymer network. The polymer network can include a water-soluble monomer. The monomer can be selected from vinyl ester-based monomers, for example, vinyl acetate, vinyl propionate, vinyl propionate, vinyl valerate, vinyl caprate, vinyl laurate, vinyl stearate, vinyl benzoate, vinyl pivalate, etc. and mixtures thereof.

Examples of other monomers that can be co-polymerized with the vinyl ester-based monomer include, for example, α-olefin monomers such as ethylene and propylene; methyl (meth)acrylate, (meth)acrylic acid alkyl ester monomers such as ethyl acidate, butyl (meth)acrylate, and 2-ethylhexyl (meth)acrylate; unsaturated amide monomers such as (meth)acrylamide and N-methylolacrylamide; unsaturated carboxylic acid monomers such as (meth)acrylic acid, crotonic acid, maleic acid, itaconic acid, fumaric acid; alkyl (methyl, ethyl, propyl, etc.) ester monomers of unsaturated carboxylic acids; unsaturated carboxylic acid anhydrides; salts of unsaturated carboxylic acids with sodium, potassium, ammonium, etc.; glycidyl group-containing monomers such as allyl glycidyl ether, glycidyl (meth)acrylate; 2-acrylamido-2-methylpropane sulfone including sulfonic acid group-containing monomers such as acids or salts thereof; phosphoric acid group-containing monomers such as acid phosphooxyethyl methacrylate and acid phosphooxypropyl methacrylate; and alkyl vinyl ether monomers.

The cross-linking agent has at least three active functional groups for polymerizing with the monomer and optionally other monomers. The cross-linking agent can also have four, five, etc. active functional groups. Below are sample illustrations of a single branching point with three, four, and five branches created from cross-linking of the polymer via the functional groups. Accordingly, each branching point can form a minimum of three bonds with pendant functional groups of the monomer to create a branched polymer network.

The cross-linking agent can be any compound having three or more active functional groups that bond with pendant functional groups of the monomer to cross-link and polymerize the monomer to form the polymer network. Examples of a cross-linking agent having three active functional groups can include, but not limited to, propanediol divinyl ether, triallyl ethers, triallyl phosphate, triallyl isocyanurate (TTT), pentaerythritol triacrylate, 1,1,1-trimethylolpropane triacrylate, 1,1,1-trimethylolpropane trimethacrylate, dipentaerythritol pentaacrylate, pentaerythritol tetraacrylate, and triallyl cyanurate. Examples of a cross-linking agent having four active functional groups can include, but not limited to, butanediol divinyl ether, tetraallyl pentaerythritol, tetraallyl orthosilicate, N~1~,N~1~, N~2~,N~2~-Tetraallyl-N'~1~,N'~2~-bis(4-methylphenyl)ethanediimidamide, tetraallyl 1,2,3,4-cyclopentanetetracarboxylate, tetraallylsilane, tetraallyl pyromellitate, pentaerythritol tetraallyl ether, and N,N,N',N'-tetraallyl-2,6-pyridinedicarboxamide. Examples of a cross-linking agent having five active functional groups can include, but not limited to, 1,2,3,5,5-Pentaallyl-1,3-cyclopentadiene, poly(allyl glycidyl ether)-b-poly(ethylene oxide)-b-poly(allyl glycidyl ether), poly(allyl glycidyl ether)-stat-poly(alkyl glycidyl ether)-block-poly(ethylene glycol)-block-poly(allyl glycidyl ether)-stat-poly(alkyl glycidyl ether).

An example of a polymer network is shown below for cross-linked polyvinyl alcohol having three total branching points. An example of a cross-linking agent, triallyl isocyanurate, is also shown below having three active functional groups to create three branches at each branching point.

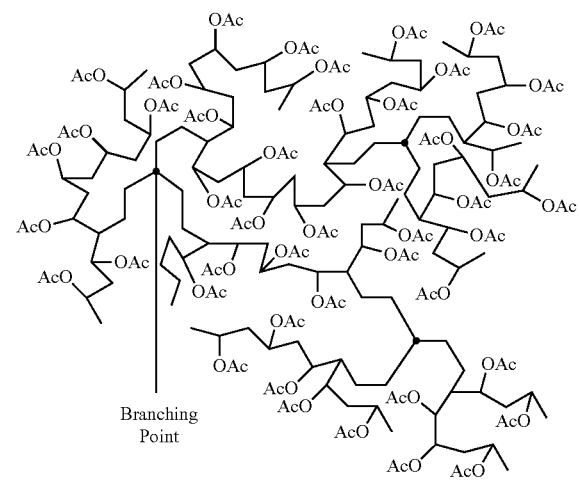

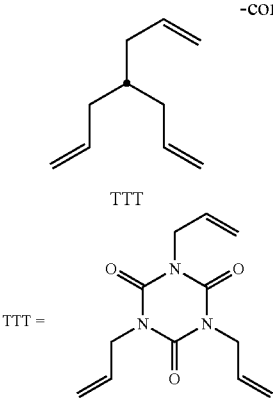

TTT =

The polymer network can be created via a variety of polymerization reactions, for example, free radical co-polymerization of a vinyl acetate monomer, solvents, and the cross-linking agent. The total number of branching points in the polymer network can be adjusted by adjusting the concentration of the cross-linking agent and/or the polymerization conditions. By way of example, increasing the concentration of the cross-linking agent can increase the total number of branching points and vice versa. The greater the number of total branching points, the greater degree of branching that occurs and yields a larger polymer network. The amount of branching can be determined based on the specific conditions of the wellbore and desired properties of the cement composition. By way of example, increased branching can create a larger polymer network, which can affect the particle size of the fluid loss additive in addition to potentially increasing the viscosity of the cement composition. According to any of the embodiments, the mole ratio of the cross-linking agent to monomer can be in the range of 0.005:100 to 10:100.

The copolymerization amount of the poly-functional monomer residue from the cross-linking agent in the polymer network can vary. According to any of the embodiments, the copolymerization amount of the poly-functional monomer residue from the cross-linking agent can be in the range of 0.001 to 1.0 mol % based on 100 mol % of the structural unit derived from the monomer. The copolymerization amount from the poly-functional monomer can also be 0.005 to 0.5 mol %, or 0.01 to 0.2 mol %.

The viscosity average degree of polymerization of the polymer can be 1,000 to 10,000, or 1,500 to 6,000, or 2,000 to 5,000. The "viscosity average degree of polymerization" (P) is a value calculated using Eq. 1 from the intrinsic viscosity [η] (g/dL) measured at 30° C. with an Ostwald viscometer using ion-exchanged water as a solvent.

$$\log(P) = 1.613 \times \log([\eta] \times 10^4/8.29) \quad \text{(Eq. 1)}$$

The fluid loss additive can be in a concentration in the range of 0.01% to 30% by weight of the cement (bwoc). The fluid loss additive can be in a concentration in the range of 0.3% to 10% bwoc. It has unexpectedly been discovered that the fluid loss additive can achieve comparable fluid loss control compared to other fluid loss additives at much lower concentrations. The ability to use lower concentrations of the fluid loss additive results in cost savings—in addition to other valuable benefits.

The cement composition can have a thickening time of at least 2 hours at a temperature of 125° F. (51° C.) and a pressure of 5,160 psi (36 MPa). In another embodiment, the cement composition has a thickening time in the range of about 4 to about 15 hours at a temperature of 125° F. (51° C.) and a pressure of 5,160 psi (36 MPa). Some of the variables that can affect the thickening time of the cement composition include the concentration of any set retarder included in the cement composition, the concentration of any salt present in the cement composition, and the bottomhole temperature of the subterranean formation. As used herein, the term "bottomhole" refers to the portion of the subterranean formation to be cemented. In another embodiment, the cement composition has a thickening time of at least 3 hours at the bottomhole temperature and pressure of the subterranean formation.

The cement composition can have an initial setting time of less than 24 hours at a temperature of 125° F. (51° C.) and a pressure of 3,000 psi (21 MPa) or the bottomhole temperature and pressure of the subterranean formation.

The cement composition can have a setting time of less than 48 hours at a temperature of 125° F. (51° C.). The cement composition can have a setting time of less than 24 hours at a temperature of 125° F. (51° C.). In any of the embodiments, the cement composition has a setting time in the range of 3 to 24 hours at a temperature of 125° F. (51° C.) or the bottomhole temperature and pressure of the subterranean formation.

The cement composition can have a compressive strength of at least 500 psi (3.5 MPa) when tested at 24 hours, a temperature of 125° F. (51° C.), and a pressure of 3,000 psi (21 MPa). The cement composition can have a compressive strength in the range of 500 to 10,000 psi (about 3.5 to about 69 MPa) when tested at 24 hours, a temperature of 125° F. (51° C.), and a pressure of 3,000 psi (21 MPa).

The cement composition can have an API fluid loss of less than 200 mL/30 min at a temperature up to 250° F. (121° C.) and a pressure differential of 1,000 psi (7 MPa). The fluid loss additive can be in at least a sufficient concentration such that the cement composition has the desired API fluid loss. The cement composition can also have an API fluid loss of less than 150 mL/30 min at a temperature up to 250° F. (121° C.) and a pressure differential of 1,000 psi (7 MPa). In other embodiments, the cement composition has an API fluid loss of less than 100 mL/30 min at a temperature up to 250° F. (121° C.) and a pressure differential of 1,000 psi (7 MPa).

It is to be understood that while the cement composition can contain other ingredients, it is the fluid loss additive that is primarily or wholly responsible for providing the requisite fluid loss control. For example, a "test cement composition" consisting essentially of, or consisting of, the water, the cement, and the fluid loss additive and in the same proportions as the cement composition can have the desirable API fluid loss. Therefore, it is not necessary for the cement composition to include other additives, such as lost-circulation materials or other fluid loss additives to provide the desired API fluid loss. It is also to be understood that any discussion related to a "test cement composition" is included for purposes of demonstrating that while the cement composition may contain other ingredients, it is the fluid loss additive that provides the desirable API fluid loss. Therefore, while it may not be possible to perform a test in a wellbore for the specific cement composition, one can formulate a test cement composition to be tested in a laboratory to identify if the ingredients and concentration of the ingredients will provide the stated fluid loss.

The cement composition can further include additional additives. Examples of additional additives include, but are not limited to, a high-density additive, a filler, a strength-retrogression additive, a set accelerator, a set retarder, a friction reducer, a mechanical property enhancing additive, a lost-circulation material, a filtration-control additive, a defoaming agent, a thixotropic additive, a nano-particle, and combinations thereof.

Examples of filler materials include, but are not limited to, fly ash, sand, clays, and vitrified shale. The filler material can be in a concentration in the range of about 5% to about 50% bwoc.

The cement composition can have a density of at least 4 pounds per gallon (ppg) (0.48 kilograms per liter (kg/1)). The cement composition can have a density in the range of 4 to 20 ppg (about 0.48 to about 2.4 kg/1). It has been discovered that in addition to higher density cement compositions, lower density cement compositions (e.g., foam cement compositions and bead slurries) can maintain excellent mechanical properties and low fluid loss with the use of the novel fluid loss additive.

The methods can include mixing the water, the cement, and the fluid loss additive together. The fluid loss additive can be in dry form that is added to the cement and water on the fly. The fluid loss additive can also be a liquid suspension that is added to the cement and water. The methods also include the step of allowing the cement composition to set. The step of allowing can be after the step of introducing the cement composition into the subterranean formation. The methods can further include the additional steps of perforating, fracturing, or performing an acidizing treatment, after the step of allowing.

An embodiment of the present disclosure is a method of cementing in a subterranean formation comprising: introducing a cement composition into the subterranean formation, the cement composition comprising: (i) cement, wherein less than 75 w/w % of the total amount of cement is Portland cement; (ii) water; and (iii) a fluid loss additive, wherein the fluid loss additive comprises a polymer network having at least one branching point formed with a monomer and a cross-linking agent that comprises at least three active functional groups; and allowing the cement composition to set. Optionally, the method further comprises wherein the water is selected from the group consisting of freshwater, brackish water, and saltwater, in any combination thereof in any proportion. Optionally, the method further comprises wherein the cement is selected from the group consisting of Portland cements, gypsum cements, high alumina content cements, slag cements, high magnesia content cements, pozzolan, fly ash, lime, slaked lime, sorels cements, and combinations thereof. Optionally, the method further comprises wherein less than 30 w/w % of the total amount of cement is Portland cement. Optionally, the method further comprises wherein the cement does not include Portland cement. Optionally, the method further comprises wherein the monomer is a vinyl ester-based monomer. Optionally, the method further comprises wherein the vinyl ester-based monomer is selected from vinyl acetate, vinyl propionate, vinyl propionate, vinyl valerate, vinyl caprate, vinyl laurate, vinyl stearate, vinyl benzoate, or vinyl pivalate. Optionally, the method further comprises wherein the fluid loss additive further comprises a second monomer that is co-polymerized with the vinyl ester-based monomer, and wherein the second monomer is selected from: α-olefin monomers; methyl (meth)acrylate, (meth)acrylic acid alkyl ester monomers; unsaturated amide monomers; unsaturated carboxylic acid monomers; alkyl ester monomers of unsaturated carboxylic acids; unsaturated carboxylic acid anhydrides; salts of unsaturated carboxylic acids; glycidyl group-containing monomers; 2-acrylamido-2-methylpropane sulfone including sulfonic acid group-containing monomers; phosphoric acid group-containing monomers; and alkyl vinyl ether monomers. Optionally, the method further comprises wherein the cross-linking agent is selected from propanediol divinyl ether, triallyl ethers, triallyl phosphate,triallyl isocyanurate (TTT), pentaerythritol triacrylate, 1,1,1-trimethylolpropane triacrylate, 1,1,1-trimethylolpropane trimethacrylate, dipentaerythritol pentaacrylate, pentaerythritol tetraacrylate, triallyl cyanurate, butanediol divinyl ether, tetraallyl pentaerythritol, tetraallyl orthosilicate, N~1~,N~1~,N~2~,N~2~-Tetraallyl-N'~1~,N'~2~-bis(4-methylphenyl)ethanediimidamide, tetraallyl 1,2,3,4-cyclopentanetetracarboxylate, tetraallylsilane, tetraallyl pyromellitate, pentaerythritol tetraallyl ether, N,N,N',N'-tetraallyl-2,6-pyridinedicarboxamide, 1,2,3,5,5-Pentaallyl-1,3-cyclopentadiene, poly(allyl glycidyl ether)-b-poly(ethylene oxide)-b-poly(allyl glycidyl ether), and poly(allyl glycidyl ether)-stat-poly(alkyl glycidyl ether)-block-poly(ethylene glycol)-block-poly(allyl glycidyl ether)-stat-poly(alkyl glycidyl ether). Optionally, the method further comprises wherein the mole ratio of the cross-linking agent to monomer is in the range of 0.005:100 to 10:100. Optionally, the method further comprises wherein the copolymerization amount of the poly-functional monomer residue from the cross-linking agent is in the range of 0.001 to 1.0 mol % based on 100 mol % of the structural unit derived from the monomer. Optionally, the method further comprises wherein the viscosity average degree of polymerization of the polymer is in the range of 1,000 to 10,000. Optionally, the method further comprises wherein the fluid loss additive is in a concentration in the range of 0.01% to 30% by weight of the cement. Optionally, the method further comprises wherein the cement composition has an API fluid loss of less than 200 mL/30 min at a temperature up to 250° F. and a pressure differential of 1,000 psi. Optionally, the method further comprises wherein the cement composition has an API fluid loss of less than 100 mL/30 min at a temperature up to 250° F. and a pressure differential of 1,000 psi. Optionally, the method further comprises wherein the cement composition has a density in the range of 4 to 20 pounds per gallons. Optionally, the method further comprises mixing the cement, the water, and the fluid loss additive together prior to introduction into the subterranean formation, and wherein the fluid loss additive is in dry form that is added to the cement and water on the fly. Optionally, the method further comprises mixing the cement, the water, and the fluid loss additive together prior to introduction into the subterranean formation, and wherein the fluid loss additive is in a liquid suspension form when added to the cement and water.

Another embodiment of the present disclosure is a cement composition comprising: water; cement, wherein less than 75 w/w % of the total amount of the cement is Portland cement; and a fluid loss additive, wherein the fluid loss additive comprises a polymer network having at least one branching point formed with a monomer and a cross-linking agent that comprises at least three active functional groups. Optionally, the method further comprises wherein the water is selected from the group consisting of freshwater, brackish water, and saltwater, in any combination thereof in any proportion. Optionally, the method further comprises wherein the cement is selected from the group consisting of Portland cements, gypsum cements, high alumina content cements, slag cements, high magnesia content cements, pozzolan, fly ash, lime, slaked lime, sorels cements, and combinations thereof. Optionally, the method further comprises wherein less than 30 w/w % of the total amount of cement is Portland cement. Optionally, the method further comprises wherein the cement does not include Portland cement. Optionally, the method further comprises wherein the monomer is a vinyl ester-based monomer. Optionally, the method further comprises wherein the vinyl ester-based monomer is selected from vinyl acetate, vinyl propionate, vinyl propionate, vinyl valerate, vinyl caprate, vinyl laurate, vinyl stearate, vinyl benzoate, or vinyl pivalate. Optionally, the method further comprises wherein the fluid loss additive further comprises a second monomer that is co-polymerized with the vinyl ester-based monomer, and wherein the second monomer is selected from: α-olefin monomers; methyl (meth)acrylate, (meth)acrylic acid alkyl ester monomers; unsaturated amide monomers; unsaturated carboxylic acid monomers; alkyl ester monomers of unsaturated carboxylic acids; unsaturated carboxylic acid anhydrides; salts of unsaturated carboxylic acids; glycidyl group-containing monomers; 2-acrylamido-2-methylpropane sulfone including sulfonic acid group-containing monomers; phosphoric acid group-containing monomers; and alkyl vinyl ether monomers. Optionally, the method further comprises wherein the cross-linking agent is selected from propanediol divinyl ether, triallyl ethers, triallyl phosphate,triallyl isocyanurate (TTT), pentaerythritol triacrylate, 1,1,1-trimethylolpropane triacrylate, 1,1,1-trimethylolpropane trimethacrylate, dipentaerythritol pentaacrylate, pentaerythritol tetraacrylate, triallyl cyanurate, butanediol divinyl ether, tetraallyl pentaerythritol, tetraallyl orthosilicate, tetraallyl 1,2,3,4-cyclopentanetetracarboxylate, tetraallylsilane, tetraallyl pyromellitate, pentaerythritol tetraallyl ether, N,N,N', N'-tetraallyl-2,6-pyridinedicarboxamide, 1,2,3,5,5-Pentaallyl-1,3-cyclopentadiene, poly(allyl glycidyl ether)-b-poly (ethylene oxide)-b-poly(allyl glycidyl ether), and poly(allyl glycidyl ether)-stat-poly(alkyl glycidyl ether)-block-poly (ethylene glycol)-block-poly(allyl glycidyl ether)-stat-poly (alkyl glycidyl ether). Optionally, the method further comprises wherein the mole ratio of the cross-linking agent to monomer is in the range of 0.005:100 to 10:100. Optionally, the method further comprises wherein the copolymerization amount of the poly-functional monomer residue from the cross-linking agent is in the range of 0.001 to 1.0 mol % based on 100 mol % of the structural unit derived from the monomer. Optionally, the method further comprises wherein the viscosity average degree of polymerization of the polymer is in the range of 1,000 to 10,000. Optionally, the method further comprises wherein the fluid loss additive is in a concentration in the range of 0.01% to 30% by weight of the cement. Optionally, the method further comprises wherein the cement composition has an API fluid loss of less than 200 mL/30 min at a temperature up to 250° F. and a pressure differential of 1,000 psi. Optionally, the method further comprises wherein the cement composition has an API fluid loss of less than 100 mL/30 min at a temperature up to 250° F. and a pressure differential of 1,000 psi. Optionally, the method further comprises wherein the cement composition has a density in the range of 4 to 20 pounds per gallons.

FIG. 1 illustrates a system that can be used in the preparation of a cement composition and delivery to a wellbore according to any of the embodiments. As shown, the cement composition can be combined in mixing equipment 4, such as a jet mixer, re-circulating mixer, or a batch mixer, for example, and then pumped via pumping equipment 6 to the wellbore. The mixing equipment 4 and the pumping equipment 6 can be located on one or more cement trucks. A jet mixer can be used, for example, to continuously mix the cement composition, including water, as it is being pumped to the wellbore.

Figure 2A:
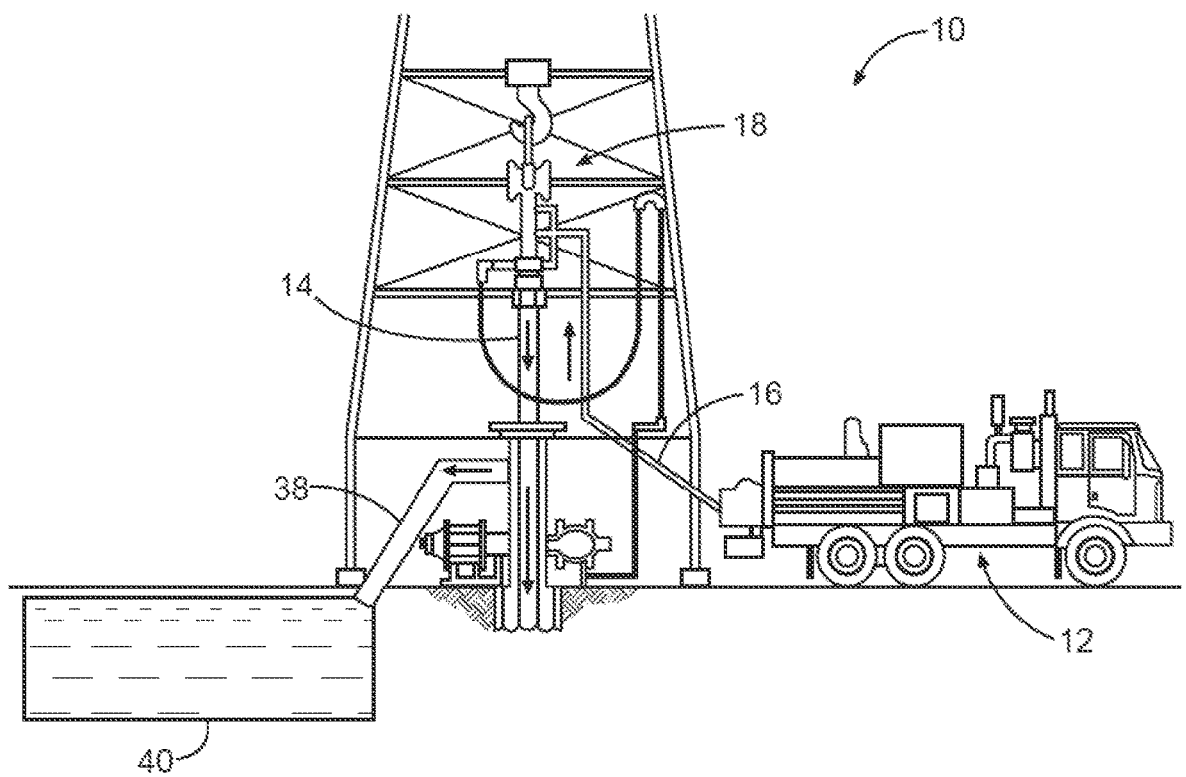
FIG. 2A illustrates surface equipment that may be used in placement of a cement composition into a wellbore.

An example technique and system for introducing cement composition into a subterranean formation will now be described with reference to FIGS. 2A and 2B. FIG. 2A illustrates surface equipment 10 that can be used to introduce the cement composition. It should be noted that while FIG. 2A generally depicts a land-based operation, those skilled in the art will readily recognize that the principles described herein are equally applicable to subsea operations that employ floating or sea-based platforms and rigs, without departing from the scope of the disclosure. The surface equipment 10 can include a cementing unit 12, which can include one or more cement trucks, mixing equipment 4, and pumping equipment 6 (e.g., as depicted in FIG. 1). The cementing unit 12 can pump the cement composition 14 through a feed pipe 16 and to a cementing head 18, which conveys the cement composition 14 downhole.

The methods include the step of introducing the cement composition into the subterranean formation 20. Turning now to FIG. 2B, the cement composition 14 can be introduced into a subterranean formation 20. The step of introducing can include pumping the cement composition into the subterranean formation using one or more pumps 6. The step of introducing can be for the purpose of at least one of the following: well completion; foam cementing; primary or secondary cementing operations; well-plugging; squeeze cementing; and gravel packing. The cement composition can be in a pumpable state before and during introduction into the subterranean formation 20. The subterranean formation 20 is penetrated by a well 22. The well can be, without limitation, an oil, gas, or water production well, an injection well, a geothermal well, or a high-temperature and high-pressure (HTHP) well. The step of introducing can include introducing the cement composition into the well 22. The wellbore 22 comprises walls 24. A surface casing 26 can be inserted into the wellbore 22. The surface casing 26 can be cemented to the walls 24 via a cement sheath 28. One or more additional conduits (e.g., intermediate casing, production casing, liners, etc.) shown here as casing 30 can also be disposed in the wellbore 22. One or more centralizers 34 can be attached to the casing 30, for example, to centralize the casing 30 in the wellbore 22 prior to and during the cementing operation. According to another embodiment, the subterranean formation 20 is penetrated by a wellbore 22 and the well includes an annulus 32 formed between the casing 30 and the walls 24 of the wellbore 22 and/or the surface casing 26. According to this other embodiment, the step of introducing includes introducing the cement composition into a portion of the annulus 32.

Figure 2B:
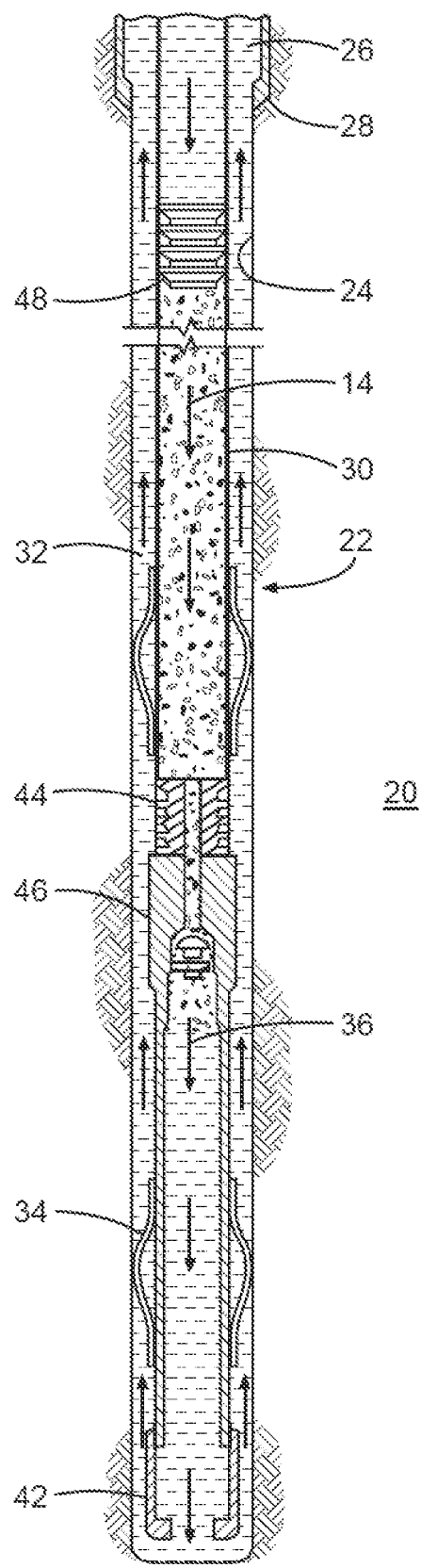
FIG. 2B illustrates placement of a cement composition into an annulus of a wellbore.

With continued reference to FIG. 2B, the cement composition 14 can be pumped down the interior of the casing 30. The cement composition 14 can be allowed to flow down the interior of the casing 30 through the casing shoe 42 at the bottom of the casing 30 and up around the casing 30 into the annulus 32. While not illustrated, other techniques can also be utilized for introduction of the cement composition 14. By way of example, reverse circulation techniques can be used that include introducing the cement composition 14 into the subterranean formation 20 by way of the annulus 32 instead of through the casing 30.

As it is introduced, the cement composition 14 may displace other fluids 36, such as drilling fluids and/or spacer fluids that may be present in the interior of the casing 30 and/or the annulus 32. At least a portion of the displaced fluids 36 can exit the annulus 32 via a flow line 38 and be deposited, for example, in one or more retention pits 40 (e.g., a mud pit), as shown on FIG. 2A. Referring again to FIG. 2B, a bottom plug 44 can be introduced into the wellbore 22 ahead of the cement composition 14, for example, to separate the cement composition 14 from the fluids 36 that may be inside the casing 30 prior to cementing. After the bottom plug 44 reaches the landing collar 46, a diaphragm or other suitable device ruptures to allow the cement composition 14 through the bottom plug 44. In FIG. 2B, the bottom plug 44 is shown on the landing collar 46. In the illustrated embodiment, a top plug 48 can be introduced into the wellbore 22 behind the cement composition 14. The top plug 48 can separate the cement composition 14 from a displacement fluid 50 and also push the cement composition 14 through the bottom plug 44.

EXAMPLES

To facilitate a better understanding of the various embodiments, the following examples are given.

All test cement compositions were mixed and tested according to the specified procedure for the specific test as described in The Detailed Description section above.

Table 1 lists the ingredients of three different cement compositions having low-Portland cement content, testing temperature, and API fluid loss. Polyvinyl alcohol is abbreviated as "PVA" and the fluid loss additive is abbreviated as "FLA."

TABLE 1

|  | Composition 1 | Composition 2 | Composition 3 |
|---|---|---|---|
| Density (ppg) | 14.5 | 14.5 | 13.2 |
| Portland cement (g) | 103.37 | 103.37 | 505.44 |
| Pozzolan (g) | 241.19 | 241.19 | 202.67 |
| Linear PVA FLA (g) | 1.38 | — | — |
| Branched PVA polymer network FLA (g) | — | 1.38 | 14.16 |
| Dispersant (g) | 0.69 | 0.69 | 0.71 |
| Defoamer (g) | 0.86 | 0.86 | — |
| Cement Set Retarder (g) | — | — | 2.12 |
| Rubber Crumb (g) | — | — | 41.36 |
| Water (g) | 173.77 | 173.77 | 498.64 |
| Temperature (° F.) | 165 | 165 | 230 |
| API fluid loss (mL) | 607 | 30 | 32 |

As can be seen in Table 1, cement composition #1 that contained a traditional linear cross-linked PVA did not perform well in low-Portland cement compositions with an API fluid loss of over 600. By contrast, cement composition #2 that contained a highly branched PVA polymer network had an API fluid loss of only 30. This demonstrates that the disclosed fluid loss additive achieves far superior fluid loss control at the same concentration over more traditional fluid loss additives. This superior fluid loss control is also achieved at higher temperatures, for example 230° F. (110° C.), as shown in cement composition #3.

Table 2 shows fluid loss and ingredients for two different non-Portland cement compositions and a control cement composition containing 100% Portland cement.

TABLE 2

|  | Composition 1 | Composition 2 | Composition 3 |
|---|---|---|---|
| Density (ppg) | 14.2 | 14.2 | 16.4 |
| Lime (g) | 103.37 | 103.37 | |
| Fly ash (g) | 241.19 | 241.19 | |
| Portland cement (g) | — | — | 416.53 |
| Linear PVA FLA (g) | 8.14 | — | |
| Branched PVA polymer network FLA (g) | — | 8.14 | 10.41 |
| Set Retarder | — | — | 2.08 |
| Set Retarder | — | — | 2.08 |
| Suspending Agent | — | — | 0.62 |
| Water (g) | 534.43 | 534.43 | 163.02 |
| Temperature (° F.) | 125 | 125 | 250 |
| API fluid loss (mL) | 619 | 54 | 26 |

As can be seen in Table 2, cement composition #1 that contained a traditional linear cross-linked PVA did not perform well in a non-Portland cement composition with an API fluid loss of over 600. By contrast, cement composition #2 that contained a highly branched PVA polymer network had an API fluid loss of less than 60. This demonstrates that the disclosed fluid loss additive achieves far superior fluid loss control at the same concentration over more traditional fluid loss additives. The favorable results are also achieved when compared to composition #3 containing only Portland cement and a highly branched PVA polymer network at a temperature of 250° F. This demonstrates that the branched PVA works very well in non-Portland cement compositions and at high temperatures.

As can also be seen from the data, the fluid loss additive works well in low density cement compositions as well as lower water content compositions. This shows the versatility, great performance, and advantages of the fluid loss additive in low- or non-Portland cements.

The exemplary fluids and additives disclosed herein may directly or indirectly affect one or more components or pieces of equipment associated with the preparation, delivery, recapture, recycling, reuse, and/or disposal of the disclosed fluids and additives. For example, the disclosed fluids and additives may directly or indirectly affect one or more mixers, related mixing equipment, mud pits, storage facilities or units, fluid separators, heat exchangers, sensors, gauges, pumps, compressors, and the like used to generate, store, monitor, regulate, and/or recondition the exemplary fluids and additives. The disclosed fluids and additives may also directly or indirectly affect any transport or delivery equipment used to convey the fluids and additives to a well site or downhole such as, for example, any transport vessels, conduits, pipelines, trucks, tubulars, and/or pipes used to fluidically move the fluids and additives from one location to another, any pumps, compressors, or motors (e.g., topside or downhole) used to drive the fluids and additives into motion, any valves or related joints used to regulate the pressure or flow rate of the fluids, and any sensors (i.e., pressure and temperature), gauges, and/or combinations thereof, and the like. The disclosed fluids and additives may also directly or indirectly affect the various downhole equipment and tools that may come into contact with the fluids and additives such as, but not limited to, drill string, coiled tubing, drill pipe, drill collars, mud motors, downhole motors and/or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

Therefore, the compositions, methods, and systems of the present disclosure are well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present disclosure.

As used herein, the words "comprise," "have," "include," and all grammatical variations thereof are each intended to have an open, non-limiting meaning that does not exclude additional elements or steps. While compositions, systems, and methods are described in terms of "comprising," "containing," or "including" various components or steps, the compositions, systems, and methods also can "consist essentially of" or "consist of" the various components and steps. It should also be understood that, as used herein, "first," "second," and "third," are assigned arbitrarily and are merely intended to differentiate between two or more fluids, additives, etc., as the case may be, and does not indicate any sequence. Furthermore, it is to be understood that the mere use of the word "first" does not require that there be any "second," and the mere use of the word "second" does not require that there be any "third," etc.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A cement composition comprising:
water;
cement, wherein Portland cement is in a concentration in a range of 0 to less than 75 w/w % of the total amount of the cement; and
a fluid loss additive, wherein the fluid loss additive consists of a polymer network having at least one branching point, wherein the polymer network consists of a water-soluble, vinyl ester-based monomer, an optional second monomer, and a cross-linking agent that comprises at least three active functional groups, wherein the cement composition has an API fluid loss of less than 200 mL/30 min at a temperature up to 250° F. (121.1° C.) and a pressure differential of 1,000 psi.

2. The composition according to claim 1, wherein the water is selected from the group consisting of freshwater, brackish water, and saltwater, in any combination thereof in any proportion.

3. The composition according to claim 1, wherein the cement is selected from the group consisting of Portland cements, gypsum cements, high alumina content cements, slag cements, high magnesia content cements, pozzolan, fly ash, lime, slaked lime, sorels cements, and combinations thereof.

4. The composition according to claim 1, wherein less than 30 w/w % of the total amount of cement is Portland cement.

5. The composition according to claim 1, wherein Portland cement is in a concentration of 0 w/w % of the total amount of cement.

6. The composition according to claim 1, wherein the vinyl ester-based monomer is selected from vinyl acetate, vinyl propionate, vinyl propionate, vinyl valerate, vinyl caprate, vinyl laurate, vinyl stearate, vinyl benzoate, or vinyl pivalate.

7. The composition according to claim 1, wherein the vinyl ester-based monomer is co-polymerized with a second monomer selected from: α-olefin monomers; methyl (meth) acrylate, (meth)acrylic acid alkyl ester monomers; unsaturated amide monomers; unsaturated carboxylic acid monomers; alkyl ester monomers of unsaturated carboxylic acids; unsaturated carboxylic acid anhydrides; salts of unsaturated carboxylic acids; glycidyl group-containing monomers; 2-acrylamido-2-methylpropane sulfone including sulfonic acid group-containing monomers; phosphoric acid group-containing monomers; or alkyl vinyl ether monomers.

8. The composition according to claim 1, wherein the cross-linking agent is selected from propanediol divinyl ether, triallyl ethers, triallyl phosphate, triallyl isocyanurate (TTT), pentaerythritol triacrylate, 1,1,1-trimethylolpropane triacrylate, 1,1,1-trimethylolpropane trimethacrylate, dipentaerythritol pentaacrylate, pentaerythritol tetraacrylate, triallyl cyanurate, butanediol divinyl ether, tetraallyl pentaerythritol, tetraallyl orthosilicate, N~1~,N~1~,N~2~, N~2~-Tetraallyl-N'~1~,N'~2~-bis(4-methylphenyl) ethanediimidamide, tetraallyl 1,2,3,4-cyclopentanetetracarboxylate, tetraallylsilane, tetraallyl pyromellitate, pentaerythritol tetraallyl ether, N,N,N',N'-tetraallyl-2,6-pyridinedicarboxamide, 1,2,3,5,5-Pentaallyl-1,3-cyclopentadiene, poly(allyl glycidyl ether)-b-poly(ethylene oxide)-b-poly(allyl glycidyl ether), or poly(allyl glycidyl ether)-stat-poly(alkyl glycidyl ether)-block-poly(ethylene glycol)-block-poly(allyl glycidyl ether)-stat-poly(alkyl glycidyl ether).

9. The composition according to claim 1, wherein the mole ratio of the cross-linking agent to monomer is in the range of 0.005:100 to 10:100.

10. The composition according to claim 1, wherein a copolymerization amount of the poly-functional monomer residue from the cross-linking agent is in the range of 0.001 to 1.0 mol % based on 100 mol % of the structural unit derived from the vinyl ester-based monomer.

11. The composition according to claim 1, wherein the viscosity average degree of polymerization of the polymer network is in the range of 1,000 to 10,000.

12. The composition according to claim 1, wherein the fluid loss additive is in a concentration in the range of 0.01% to 30% by weight of the cement.

13. The composition according to claim 1, wherein the cement composition has an API fluid loss of less than 100 mL/30 min at a temperature up to 250° F. and a pressure differential of 1,000 psi.

14. The composition according to claim 1, wherein the cement composition has a density in the range of 4 to 20 pounds per gallons.

15. The composition according to claim 1, wherein the fluid loss additive is in dry form prior to combining with the cement and water.

16. The composition according to claim 1, wherein the fluid loss additive is in a liquid suspension form prior to combining with the cement and water.

17. The composition according to claim 1, wherein the fluid loss additive is in a concentration in the range of 0.3% to 10% by weight of the cement.

18. The composition according to claim 1, wherein the cement composition further comprises an additional additive.

19. The composition according to claim 18, wherein the additional additive is selected from the group consisting of a high-density additive, a filler, a strength-retrogression additive, a set accelerator, a set retarder, a friction reducer, a mechanical property enhancing additive, a lost-circulation material, a filtration-control additive, a defoaming agent, a thixotropic additive, a nano-particle, and combinations thereof.

* * * * *